(12) United States Patent
Gugel et al.

(10) Patent No.: US 10,243,419 B2
(45) Date of Patent: Mar. 26, 2019

(54) ARRANGEMENT FOR THE STATOR COOLING OF AN ELECTRIC MOTOR

(71) Applicant: Deere & Company, Moline, IL (US)

(72) Inventors: Rainer Gugel, Plankstadt (DE); Norbert Fritz, Ilvesheim (DE); David Mueller, Stutensee (DE)

(73) Assignee: DEERE & COMPANY, Moline, IL (US)

( * ) Notice: Subject to any disclaimer, the term of this patent is extended or adjusted under 35 U.S.C. 154(b) by 149 days.

(21) Appl. No.: 14/792,125

(22) Filed: Jul. 6, 2015

(65) Prior Publication Data

US 2016/0006302 A1    Jan. 7, 2016

(30) Foreign Application Priority Data

Jul. 7, 2014    (DE) .................. 10 2014 213 159
Jul. 3, 2015    (EP) ...................... 15175317

(51) Int. Cl.
     *H02K 1/20*      (2006.01)
     *H02K 9/19*      (2006.01)
     *H02K 3/24*      (2006.01)

(52) U.S. Cl.
     CPC ................. *H02K 1/20* (2013.01); *H02K 3/24* (2013.01); *H02K 9/19* (2013.01)

(58) Field of Classification Search
     CPC ........ H02K 1/165; H02K 3/487; H02K 3/345; H02K 1/20; H02K 3/24; H02K 9/19
     USPC ............................ 310/216.069, 214, 215, 54
     See application file for complete search history.

(56) References Cited

U.S. PATENT DOCUMENTS

| | | | |
|---|---|---|---|
| 5,214,839 A * | 6/1993 | Rieber | H02K 3/493 29/596 |
| 2003/0062780 A1 | 4/2003 | Kaneko et al. | |
| 2004/0012294 A1* | 1/2004 | Rippel | H02K 1/20 310/60 A |
| 2005/0012409 A1* | 1/2005 | Philippart | H02K 3/24 310/54 |
| 2012/0080982 A1 | 4/2012 | Bradfield | |
| 2013/0140924 A1 | 6/2013 | Glubrecht | |

FOREIGN PATENT DOCUMENTS

| | | | |
|---|---|---|---|
| DE | 19743430 A1 * | 12/1998 | ............. H02K 1/08 |
| FR | 2840122 A1 * | 11/2003 | ............. H02K 3/24 |
| JP | 2005012989 A * | 1/2005 | |

(Continued)

OTHER PUBLICATIONS

Yanagida (JP 2005012989 A) English Translation.*

(Continued)

*Primary Examiner* — Quyen P Leung
*Assistant Examiner* — Robert E Mates

(57) ABSTRACT

Arrangement for the stator cooling of an electric motor, comprising a stator lamination package with a large number of axial stator laminations lined up axially, next to one another, and several axial winding grooves in the stator lamination package for the holding of corresponding stator windings. In accordance with the invention, a radial recess formed in one of the stator laminations leads into each of the winding grooves, wherein the radial recess communicates with a cooling liquid conduit provided on the stator lamination package for the delivery of cooling liquid.

16 Claims, 2 Drawing Sheets

(56) References Cited

FOREIGN PATENT DOCUMENTS

JP         2009240113 A  * 10/2009
JP         2011055645 A     3/2011

OTHER PUBLICATIONS

Sonnenburg (DE 19743430 A1) English Translation.*
Fukushima (JP 2009240113 A) English Translation.*
Bui (FR 2840122 A1) English Translation.*
European Search Report in foreign counterpart application No. 15175317.5 dated Apr. 1, 2016 (9 pages).
DE Search Report in foreign counterpart application No. 10 2014 213 159.6 dated Dec. 11, 2017 (10 pages).

* cited by examiner

ARRANGEMENT FOR THE STATOR COOLING OF AN ELECTRIC MOTOR

CLAIM FOR PRIORITY

This application claims the benefit of priority to German Application No. DE 102014213159.6 filed Jul. 7, 2014, the contents of which are hereby incorporated by reference, and this application claims the benefit of priority to European Application No. 15175317.5 filed Jul. 3, 2015, the contents or which are hereby incorporate by reference, and which claims the priority benefit to German Application No. DE 102014213159.6 filed Jul. 7, 2014.

FIELD OF THE DISCLOSURE

The invention concerns an arrangement for the stator cooling of an electric motor.

BACKGROUND

Cooling of an electric synchronous motor is known, such as in US20050012409 that has a large number of current-carrying wire windings arranged in corresponding recesses of a stator, where a longitudinal cooling conduit, impinged on by a cooling liquid, is introduced into each of the recesses. The cooling conduits provided between the wire windings and an air gap of the synchronous motor hereby form a heat shield to protect the rotor, which is made of a permanently magnetized material. The cooling conduits, formed as separate metal tubes, require not only additional installation space, but permit only a limited cooling of the adjacent wire windings as a result of the comparatively high thermal contact resistance.

SUMMARY

The arrangement in accordance with the invention comprises a stator lamination package with a large number of stator laminations that are lined up, axially, next to one another, and several winding grooves that run axially in the stator lamination package for the holding of the corresponding stator windings. In accordance with the invention, a radial recess formed in one of the stator laminations leads into each of the winding grooves, wherein the radial recess communicates with a cooling liquid conduit, provided on the stator lamination package, for the delivery of the cooling liquid.

Since the stator windings within the winding grooves are directly flushed with a cooling liquid, a particularly efficient and structurally compact cooling of the current-carrying stator windings is made possible. At the same time, an excess heat effect on the rotor of the electric motor, which is made of a permanently magnetized material, is prevented.

Typically, the electric motor is a three-phase-current-operated synchronous motor, in which a large number of similar winding grooves for holding the stator windings made of enameled copper wire are introduced along an inner circumference of the stator lamination package. So as to have the best-possible flushing of the stator windings with the cooling liquid, at least one radial recess that communicates with an individual cooling liquid conduit leads into each of the winding grooves. The winding grooves are covered by a corresponding sliding cover in the direction of an air gap of the electric motor, so that an uncontrolled exiting of the cooling liquid in the direction of the rotating rotor of the electric motor is prevented.

A possible use of the arrangement in accordance with the invention, for example, is in connection with commercial agricultural vehicles, since here, increased demands are made on the cooling of the electric motors that may be used, as a result of the required high power densities of electrical driving systems.

The radial recess in the stator lamination can be designed as a one-sided, groove-shaped indentation or as a slot-shaped opening. The use of a one-sided, groove-shaped indentation permits providing several radial recesses in one and the same stator lamination, whereas the slot-shaped opening can be implemented as a component of a punched part of an automatic machine, which can be produced at low cost. In order to cover the slot-shaped opening on the side, the immediately adjacent stator laminations in the stator lamination package are either made without slots or are arranged so they are misaligned relative to one another.

To cool the rotor of the electric motor, there is the possibility for the winding grooves to be partially covered with a corresponding sliding cover, with respect to an air gap of the electric motor, in such a way that cooling liquid conducted into the winding grooves can exit, in a controlled manner, in the direction of the air gap and thus the rotor next to it. The cooling liquid is, in particular, a traditional hydraulic oil, such as is used, for example, in gears of commercial agricultural vehicles.

It is also conceivable for the stator laminations to be lined up loosely, next to one another, in such a way that cooling liquid conducted into the winding grooves can exit, in a controlled manner, between adjacent stator laminations, in the direction of an air gap of the electric motor. The cooling liquid penetrating between the stator laminations makes possible not only a cooling of the rotor next to the air gap, but also a cooling of the stator lamination package itself.

If such a cooling should not be desired, then the stator laminations can also be connected liquid-tight with one another. This can be done, for example, by vacuum impregnation of the entire stator lamination package with a baking lacquer or the like.

The cooling liquid conduit is, in particular, designed as a groove-shaped liquid channel running axially outside the stator lamination package, wherein the groove-shaped liquid channel is sealed, with respect to the outside, by means of a motor housing surrounding the stator lamination package. The groove-shaped liquid channel is used, at the same time, for the cooling of the stator lamination package, in the form of a rear cooling of the stator and the release of heat to the adjacent motor housing, which is perhaps provided with cooling ribs. Alternatively, the cooling liquid conduit can also be designed as an opening borehole running axially within the stator lamination package or as a radially circumferential ring channel along an outer side of the stator lamination package, into which a supply connection, introduced into the motor housing, leads for the purpose of delivering the cooling liquid.

The delivery of the cooling liquid into the groove-shaped liquid channel or the axial opening borehole can be done on a front side of the stator lamination package. For this purpose, a distributor channel within the motor housing can be provided, which is coupled, on the front side, on the groove-shaped liquid channel or the axial opening borehole.

The radial recess, formed in the stator lamination, relative to the axial extension of the rotor lamination package, can lead, in the center, into the winding groove. The cooling liquid exiting from the winding groove on both front sides of the stator lamination package can, in this case, be correspondingly sent on for the purpose of cooling the winding heads on the ends of the stator windings.

Moreover, it is possible for one or more axial indentations and/or bulges to be provided along an inner side of the winding grooves. These are used as spacers within the winding grooves for a film-like groove insulation surrounding the stator windings. In this way, the indentations and/or bulges not only ensure an unhindered throughflow of the cooling liquid within the winding grooves past the film-like groove insulation, but rather increase, at the same time, their cooling-effective inside surface, which leads to a further reduced thermal contact resistance between the cooling liquid and the stator lamination package.

BRIEF DESCRIPTION OF THE DRAWINGS

Below, the arrangement in accordance with the invention is explained in more detail with the aid of the appended drawings. With regard to their function, coinciding or comparable components are marked with the same reference symbols. The figures show the following.

DETAILED DESCRIPTION

Figure 1:
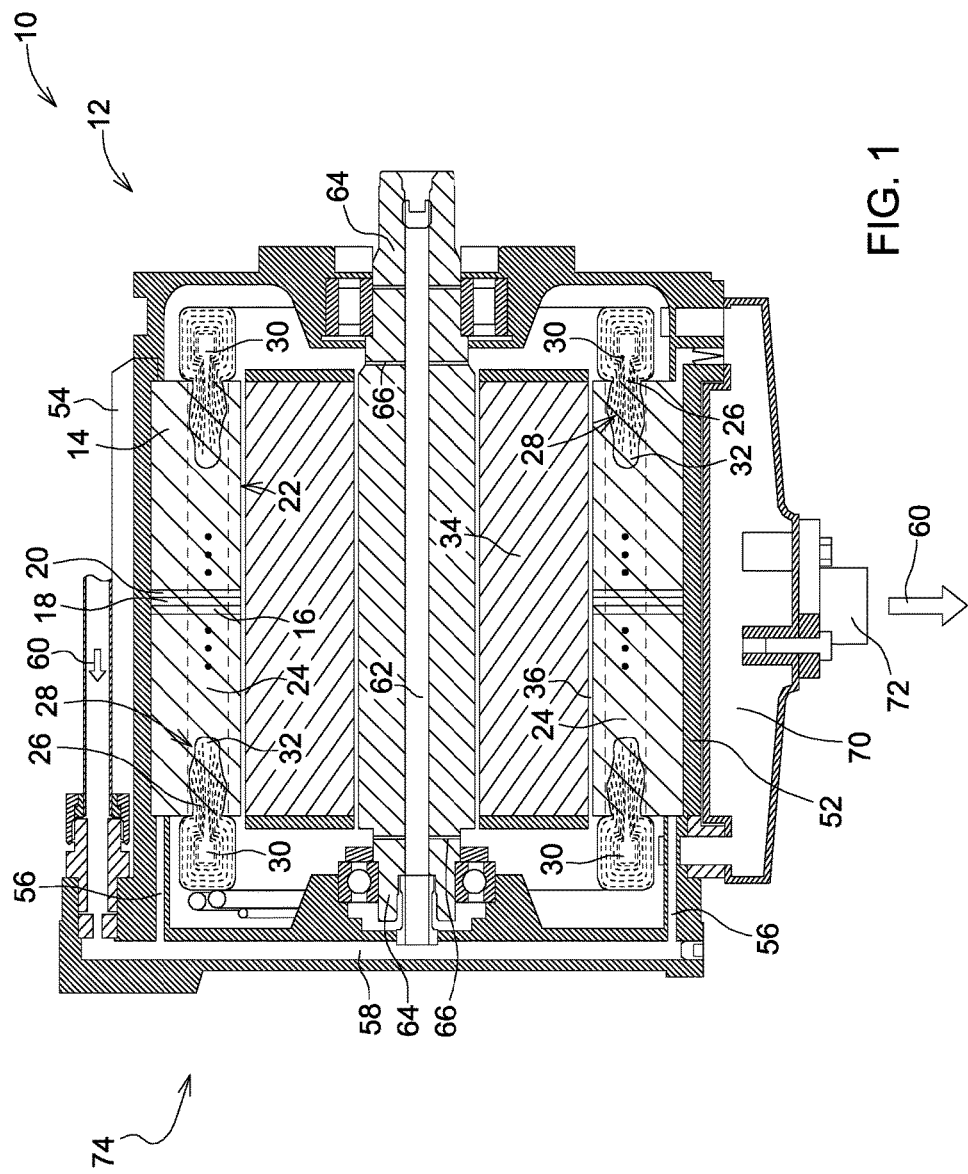
FIG. 1 shows an embodiment example of the arrangement in accordance with the invention for the stator cooling of an electric motor depicted in a longitudinal section.
Figure 2:
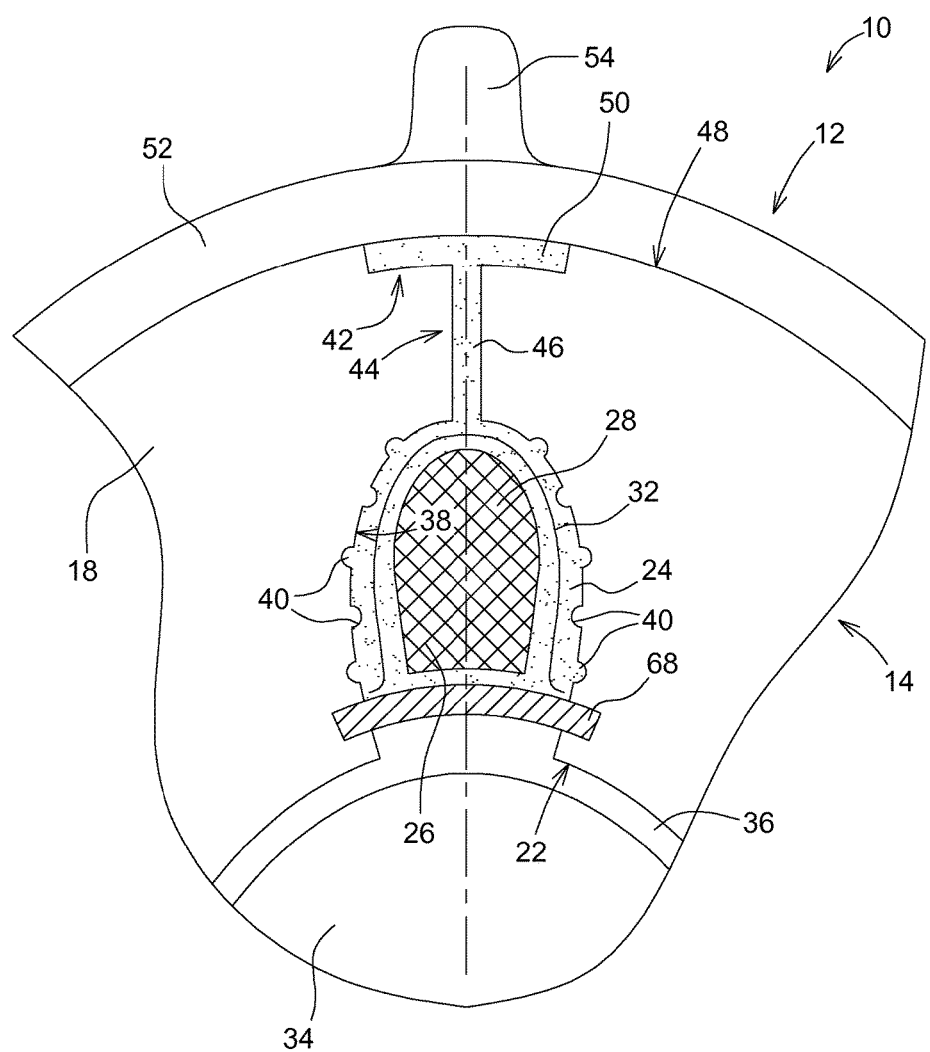
FIG. 2 shows the embodiment example of the arrangement in accordance with the invention depicted in FIG. 1, with an electric motor depicted in a cross-section.

FIG. 1 shows an embodiment of the arrangement in accordance with the invention for the stator cooling of an electric motor depicted in a longitudinal section, wherein other details of the arrangement in accordance with the invention can be deduced with reference to the cross-section depiction of the electric motor shown in FIG. 2.

The electric motor 12 comprised by the arrangement 10 in accordance with the invention is, according to the example, a three-phase-current-operated synchronous motor. The electric motor 12 has a stator lamination package 14 made of a highly permeable iron material. For the reduction of undesired eddy current losses, the stator lamination package 14 consists of a large number of stator laminations 16, 18, and 20 lined up, axially, next to one another, of which only three are shown in FIG. 1 for reasons of clarity. The stator laminations 16, 18, and 20 produced as punched parts of an automatic machine have thicknesses of 0.5 to 5 mm.

A large number of axial winding grooves 24 are provided along an inside circumference 22 of the stator lamination package 14. Each of the winding grooves 24 is used to hold a stator winding 28 produced from enameled copper wire 26. The stator windings 28 emerging on the front side 74 on the stator lamination package 14 form corresponding winding heads 30 on their ends. To avoid short circuits, the stator windings 28 are surrounding by a film-like groove insulation 32. The film-like groove insulation 32 is, for example, a Kapton film.

Moreover, the electric motor 12 has a cylindrical rotor 34, which is supported so that it can rotate within the stator lamination package 14. The rotor 34, which is made of permanently magnetized material, can be made to rotate under the effect of an alternating magnetic field that can be created by means of the stator windings 28. The stator lamination package 14 and the rotor 34 are separated from one another by an air gap 36. The air gap 36 has a dimension of 0.3 to 0.5 mm.

FIG. 2 shows an individual representative of the other similarly formed winding grooves 24. As can be seen, the film-like groove insulation 32 surrounds the stator winding 28 in the form of a loop. Several axial indentations and/or bulges 40 are provided along an inner side 38 of the winding groove 24. They are used within the winding groove 24 as a spacer for the film-like groove insulation 32 and the increase of the cooling-effective inside surface.

To conduct away the heat loss that arises during the operation of the electric motor 12 into the current-carrying stator windings 28, at least one radial recess 44, communicating with an individual cooling liquid conduit 42, leads into each of the winding grooves 24. In accordance with the example, the radial recess 44 in the stator lamination 18 is designed as a slot-shaped opening 46. In order to cover the slot-shaped opening 46 on the side, the immediately adjacent stator laminations 16, 20 in the stator lamination package 14 are either made without slots or are arranged so they are misaligned relative to one another. Deviating from this, the radial recess 44 in the stator lamination 18 can also be designed as a one-sided groove-shaped indentation.

With regard to the axial extension of the stator lamination package 14, the radial recess 44 leads, essentially in the center, into the winding groove 24. The cooling liquid leaving from the winding grooves 24 on the front side 74 of the stator lamination package 14 is correspondingly sent on for the purpose of the cooling of the winding heads 30 on the ends of the stator windings 28.

In the case under consideration, the cooling liquid conduit 42 is designed as an axial groove-shaped liquid channel 50 in an outer side 48 of the stator lamination package 14, wherein the groove-shaped liquid channel 50 is sealed off, relative to the outside, by means of a motor housing 52 surrounding the stator lamination package 14. The groove-shaped liquid channel 50 is used, at the same time, for the cooling of the stator lamination package 14 in the form of a rear cooling of the stator and the heat release to the adjacent motor housing 52 provided with cooling ribs 54.

The delivery of the cooling liquid into the groove-shaped liquid channel 50 is carried out on the front side 74 of the stator lamination package 14. For this purpose, a distributor channel 56 is provided within the motor housing 52; it couples, on the front side 74, with the groove-shaped liquid channel 50.

A part of the cooling liquid supplied to the distributor channel 56 via a central supply conduit 58 and taken from the cooling liquid circulation 60 indicated by arrows is conducted through a central borehole 62 within the rotor 34 and goes from there to radial boreholes 66 formed in the area of the corresponding rotor flange 64, from which the cooling liquid is hurled in the direction of the winding heads 30, so as to cool them, when the rotor 34 is rotating.

The winding grooves 24 are covered, by means of a corresponding sliding cover 68, in the direction of the air gap 36 of the electric motor 12. Stated more precisely, the winding grooves 24 are partially sealed off by means of the sliding cover 68, relative to the air gap 36 of the electric motor 12, in such a way that the cooling liquid conducted into the winding grooves 24 can leave, in a controlled manner, in the direction of the air gap 36 and thus of the rotor 34 next to it in order to cool it. The sliding cover 68 is made of a heat-resistant plastic, in particular, of Pertinax or something similar.

In accordance with an optional development, the stator laminations of the stator lamination package 14 are loosely lined up next to one another, in such a way that the cooling liquid conducted into the winding grooves 24 can leave between adjacent stator laminations in the direction of the air gap 36 of the electric motor 12. The cooling liquid penetrating between the stator laminations not only makes possible a cooling of the rotor 34 next to the air gap, but also cools the stator lamination package 14 itself.

If such a cooling is not to be desired, then the stator laminations are connected liquid-tight with one another. This is done by vacuum impregnation of the entire stator lamination package 14 by means of a baking lacquer or something similar. To guarantee or restore the penetration capacity of the cooling liquid-carrying passages within the stator lamination package 14 in the case under consideration, in other words, the formed cooling liquid conduits 42, the radial recesses 44, and the winding grooves 24, perhaps a corresponding reworking of the stator lamination package 14 after the vacuum impregnation may be required.

The cooling liquid flowing from the air gap 36 or from the winding heads 30 is collected in a bottom vat 70 of the motor housing 52 and subsequently returned via a discharge conduit 72 into the cooling liquid circulation connected with the electric motor 12. The cooling liquid is traditional hydraulic oil, as it is used, for example, in gears of commercial agricultural vehicles.

What is claimed is:

1. An electric motor comprising:
    a plurality of stator windings;
    a stator lamination package including a plurality of stator laminations positioned axially next to one another;
    a plurality of axial grooves in the stator lamination package configured to hold the plurality of stator windings;
    a cooling liquid conduit provided on the stator lamination package for the delivery of cooling liquid; and
    a sliding cover positioned entirely radially inwards relative to a radially inward surface defined by the stator windings;
    wherein a radial recess is formed in one of the plurality of the stator laminations, the radial recess leading into one of the axial grooves and in fluid communication with the cooling liquid conduit.

2. The electric motor of claim 1, wherein the radial recess comprises a one-sided groove-shaped indentation or a slot-shaped opening.

3. The electric motor of claim 2, further comprising an air gap;
    wherein the plurality of axial grooves are partially sealed off by the sliding cover relative to the air gap such that a cooling liquid conducted in the plurality of axial grooves can leave, in a controlled manner, in a direction of the air gap.

4. The electric motor of claim 3, wherein the plurality of stator laminations are positioned next to one another in such a way that cooling liquid conducted in the axial grooves between the adjacent stator laminations can leave, in a controlled manner, in the direction of the air gap.

5. The electric motor of claim 3, wherein the plurality of stator laminations are connected liquid-tight with one another.

6. The electric motor of claim 1, further comprising a motor housing surrounding the stator lamination package;
    wherein the cooling liquid conduit is formed as an axial groove-shaped liquid channel in an outer side of the stator lamination package; and
    wherein the groove-shaped liquid channel is sealed off by the motor housing.

7. The electric motor of claim 6, wherein the delivery of the cooling liquid into the axial groove-shaped liquid channel is carried out on an axial front side of the stator lamination package.

8. The electric motor of claim 1, wherein one or more axial indentations and/or bulges are provided along an inner side of the plurality of axial grooves.

9. The electric motor of claim 1, wherein the sliding cover is positioned entirely radially inwards relative to the plurality of axial grooves.

10. The electric motor of claim 1, wherein the sliding cover is hump-shaped.

11. The electric motor of claim 1, wherein the sliding cover includes a curved radially outer surface, and the curved radially outer surface is positioned entirely radially inwards relative to the radially inward surface.

12. The electric motor of claim 1, wherein the sliding cover includes a curved radially inner surface, and the curved radially inner surface is positioned entirely radially inwards relative to the radially inward surface.

13. The electric motor of claim 1, wherein the sliding cover includes a curved radially inner surface and a curved radially outer surface that is parallel thereto, and the radially inner and outer surfaces are positioned entirely radially inwards relative to the radially inward surface.

14. The electric motor of claim 1, wherein the sliding cover includes a single curved radially inner surface and a single curved radially outer surface.

15. The electric motor of claim 14, wherein the radially inner and outer surfaces are positioned entirely radially inwards relative to the radially inward surface.

16. The electric motor of claim 14, wherein the radially outer surface is contoured in parallel relative to the curved radially inner surface.

* * * * *